United States Patent
Abido et al.

(10) Patent No.: US 9,941,702 B2
(45) Date of Patent: Apr. 10, 2018

(54) FAULT RIDE-THROUGH AND POWER SMOOTHING SYSTEM

(71) Applicant: KING FAHD UNIVERSITY OF PETROLEUM AND MINERALS, Dhahran (SA)

(72) Inventors: Mohammad Ali Abido, Dhahran (SA); Muhammed Y. Worku, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 192 days.

(21) Appl. No.: 14/981,811

(22) Filed: Dec. 28, 2015

(65) Prior Publication Data

US 2017/0187189 A1    Jun. 29, 2017

(51) Int. Cl.
*H02J 3/00* (2006.01)
*H02J 3/38* (2006.01)
*H02M 3/158* (2006.01)
*H02M 7/5395* (2006.01)

(52) U.S. Cl.
CPC .......... *H02J 3/383* (2013.01); *H02M 3/1582* (2013.01); *H02M 7/5395* (2013.01)

(58) Field of Classification Search
None
See application file for complete search history.

(56) References Cited

U.S. PATENT DOCUMENTS

| | | | |
|---|---|---|---|
| 8,816,535 B2 | 8/2014 | Adest et al. | |
| 8,873,207 B2 * | 10/2014 | Dillig | H01H 83/02 |
| | | | 324/510 |
| 9,606,163 B2 * | 3/2017 | Ando | G01R 31/025 |
| 2013/0182477 A1 | 7/2013 | De Brabandere et al. | |
| 2016/0308440 A1 * | 10/2016 | Yan | H02M 3/158 |

FOREIGN PATENT DOCUMENTS

EP     2 290 774 A1    3/2011
WO   WO 2014/059949 A1    4/2014

OTHER PUBLICATIONS

Gkavanoudis et al., "A combined fault ride-through and power smoothing control method for full-converter wind turbines employing Supercapacitor Energy Storage System," Electric Power Systems Research, vol. 106, pp. 62-72, Jan. 2014.
M. A. Abido and Muhammed Y. Worku, "Real-time implementation of grid-connected PV system with decoupled P-Q controllers," 2014 22nd Mediterranean Conference of Control and Automation (MED), pp. 841-846, Palermo, Italy, Jun. 16-19, 2014.

* cited by examiner

*Primary Examiner* — Long Nguyen
(74) *Attorney, Agent, or Firm* — Richard C. Litman

(57) ABSTRACT

The fault ride-through and power smoothing system includes a buck converter for Maximum Power Point Tracking (MPPT) of a PV array power system, a buck-boost converter to connect a supercapacitor energy storage system (SCESS) to the DC link, and a voltage source converter (VSC) to transfer the DC link power to the grid. Three independent controllers are implemented, one for each power electronics block. The effectiveness of the controllers is examined on Real Time Digital Simulator (RTDS).

3 Claims, 19 Drawing Sheets

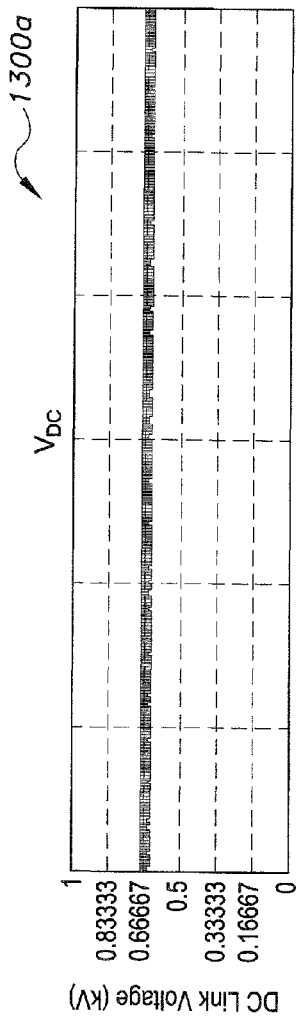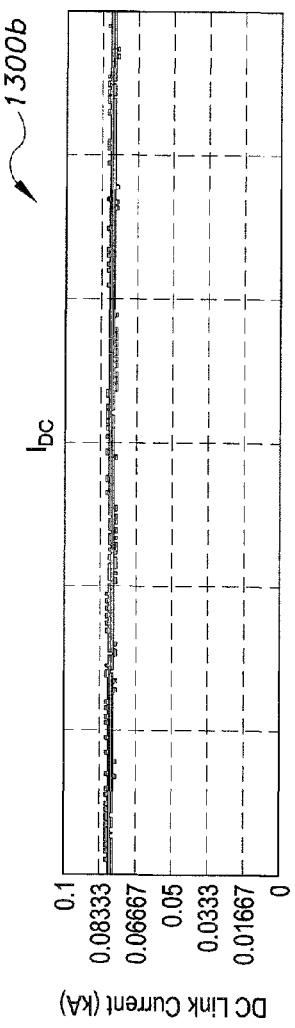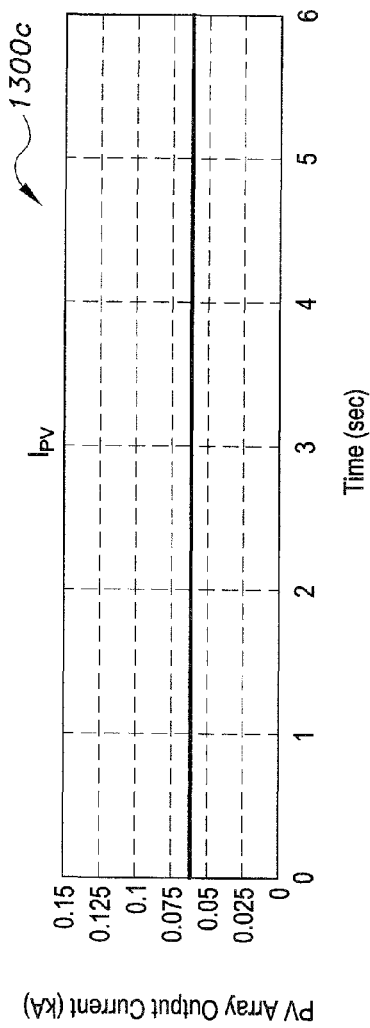
Fig. 13A
Fig. 13B
Fig. 13C

FAULT RIDE-THROUGH AND POWER SMOOTHING SYSTEM

BACKGROUND OF THE INVENTION

1. Field of the Invention

The present invention relates generally to electrical power conversion, and particularly to a fault ride-through and power smoothing system that enhances the capacity of a photovoltaic power generation system equipped with supercapacitor energy storage to ride through a grid fault to smoothly maintain power at the grid or load.

2. Description of the Related Art

The increased level of photovoltaic array penetration into the power system has resulted in the revision of Grid Codes for photovoltaic generators in many countries. Grid codes issued during the last few years invariably demand that wind farms and PV systems must withstand voltage dips to a certain percentage of the nominal voltage (down to 0% in some cases) and for a specified duration. Such requirements are known as Fault Ride Through (FRT) or Low Voltage Ride Through (LVRT), and are described by a voltage vs. time characteristic curve.

Different countries have their own grid codes to integrate PV systems, such as IEC 61727, which specifies PV systems characteristics of the utility interface. VDE-AR-N 4105 specifies for PV and other power generation systems the requirements for low voltage (LV) distribution network integration, and the German Association of Energy and Water Industries BDEW specifies the requirements for medium voltage (MV) distribution networks.

One concern of using PV as a power generation unit is that its output power is unpredictable as a result of varying irradiation and temperature. To overcome this fluctuation, different energy storage devices are integrated to the PV system. Among these, battery and supercapacitor energy storage systems (SCESS) are used in the literature because of their high energy and power densities, respectively.

Some work has been done to integrate SCESS with STATCOM for low voltage and fault ride-through, as well as smoothing power fluctuation of wind energy systems. In many existing smoothing systems, DC link voltage is assumed constant. In reality, due to changing temperatures and irradiance in photovoltaic systems, DC link voltage is rarely constant.

Thus, a fault ride-through and power smoothing system solving the aforementioned problems is desired.

SUMMARY OF THE INVENTION

The fault ride-through and power smoothing system provides a buck converter for Maximum Power Point Tracking (MPPT) of a PV array power system, a buck-boost converter to connect a supercapacitor energy storage system (SCESS) to the DC link, and a voltage source converter (VSC) to transfer the DC link power to the grid. Three independent controllers are implemented, one for each power electronics block. The effectiveness of the controllers is examined on Real Time Digital Simulator (RTDS), and the results verify the effectiveness and superiority of the present approach.

These and other features of the present invention will become readily apparent upon further review of the following specification and drawings.

BRIEF DESCRIPTION OF THE DRAWINGS

FIG. 13A is a plot illustrating the DC link voltage $V_{DC}$ in RTDS testing.

FIG. 13B is a plot illustrating the DC link current $I_{DC}$ in RTDS testing.

FIG. 13C is a plot illustrating PV output current $I_{PV}$ in RTDS testing.

Similar reference characters denote corresponding features consistently throughout the attached drawings.

DETAILED DESCRIPTION OF THE PREFERRED EMBODIMENTS

It will be understood that the diagrams in the Figures depicting the fault ride through and power smoothing system are exemplary only. The control processes and circuitry defined herein may be embodied in a dedicated electronic device having a microprocessor, microcontroller, digital signal processor, application specific integrated circuit, field programmable gate array, any combination of the aforementioned devices, or other analog or digital device that combines the functionality of the fault ride through and power smoothing system using discrete components, a single chip, or multiple chips configured to carry out the control processes described herein.

Moreover, the control processes may be embodied in a general purpose computer having the appropriate peripherals attached thereto and software stored on non-transitory computer readable media, such as hard drives, programmable memory chips, floppy disks, USB drives, and the like, that can be loaded into main memory and executed by a processing unit to carry out the functionality and steps of the control processes.

Figure 1:
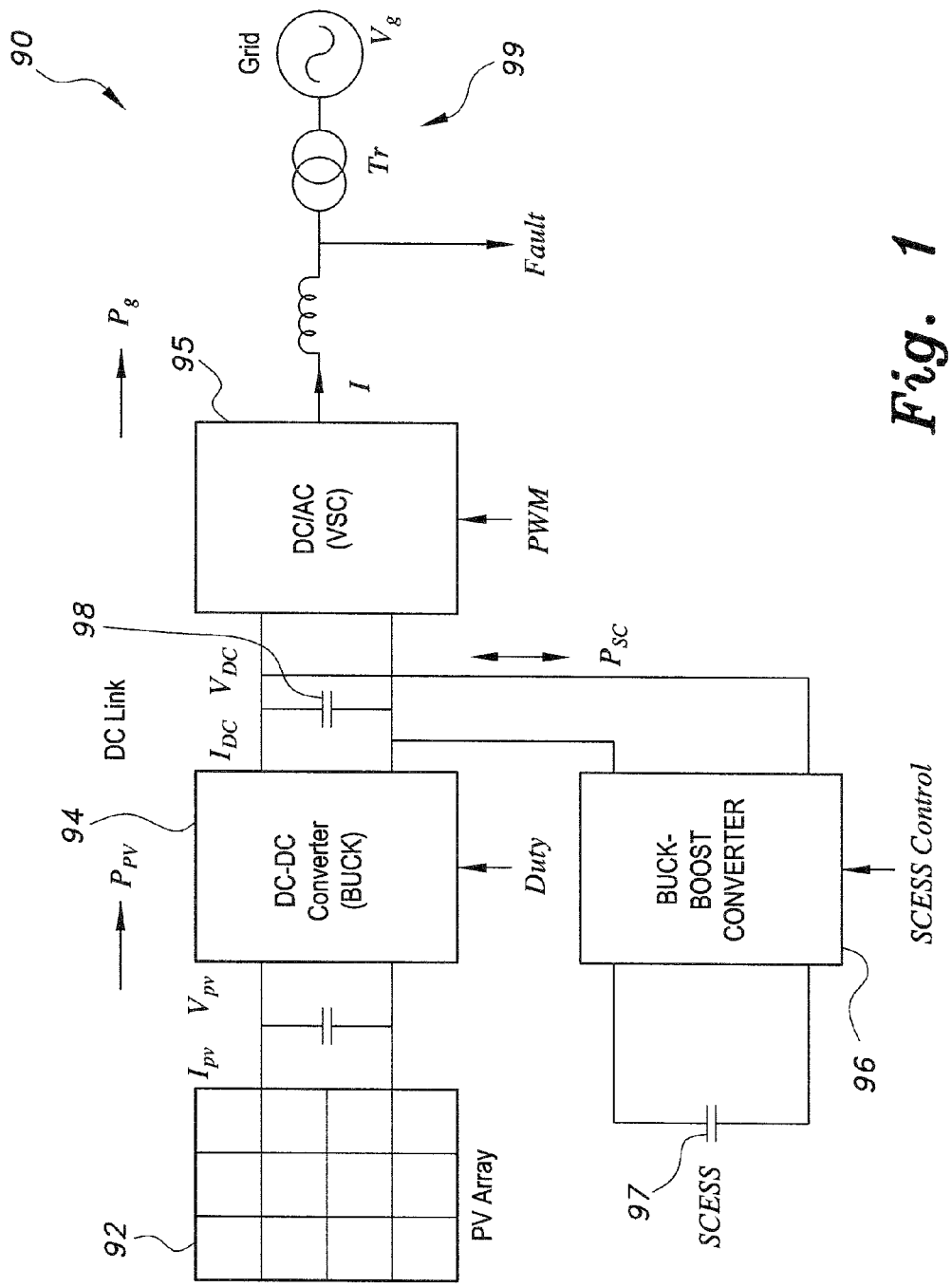
FIG. 1 is a block diagram of a fault ride-through and power smoothing system according to the present invention.

As shown in FIG. 1, the fault ride-through and power smoothing system 90 is used in a system having a PV array 92 connected to a power grid 99, and includes a DC-DC (buck) converter 94 for maximum power point tracking (MPPT) of the PV array 92, a buck-boost converter 96 to connect a supercapacitor energy storage system (SCESS) 97 to the DC link 98, and a voltage source converter (VSC) to transfer the DC link power to the grid. Three independent controllers are implemented for each power electronics block. The effectiveness of the controllers is examined on Real Time Digital Simulator (RTDS), and the results verify the effectiveness and superiority of the present approach.

The system 90 implements a vector control technique based on the decoupling of real and reactive power. The PV array system attains its pre-fault status immediately after the fault is cleared.

FIG. 1 depicts the configuration of a grid integrated PV system with energy storage. The PV array 92, which is formed from a number of modules, converts the solar irradiation and temperature into DC current and voltage. These values are varying throughout the day, depending on the irradiation and temperature at any particular time. To make the DC power generated from the PV array 92 suitable for the inverter and to implement MPPT, a buck or boost converter can be used. In the present fault ride-through and power smoothing system 90, a buck converter 94 is utilized for this purpose. The duty cycle of the buck converter 94 is continuously adjusted under varying irradiation and temperature to instantly locate the maximum voltage or current to obtain the maximum power output from connected PV arrays 92. The capacitive energy storage 97 is connected to the DC link capacitor 98 between the buck converter 94 and the inverter 95 using a bidirectional buck boost converter 96. The DC link voltage is kept constant by this converter 96 for real power delivery by absorbing any mismatch between the generated power and the power transferred to the grid. A P-Q controller is implemented for the inverter 95 to transfer the available power of the DC link capacitor to either an AC load or to the main grid during normal operation, and during fault at the grid side of the DC link, power will be stored in the SCESS (SuperCapacitor Energy Storage System) 97. From FIG. 1, $I_{PV}$, $V_{PV}$, and $P_{PV}$ represent the current, voltage, and power generated from the PV array, respectively, $P_{SC}$ is the power exchanged between the DC link 98 and the SCESS 97, and $I_{DC}$ and $V_{DC}$ are the DC link current and voltage, respectively. I, $V_g$, and $P_g$ are the grid current, grid voltage and power delivered to the grid 99, respectively.

Figure 2:
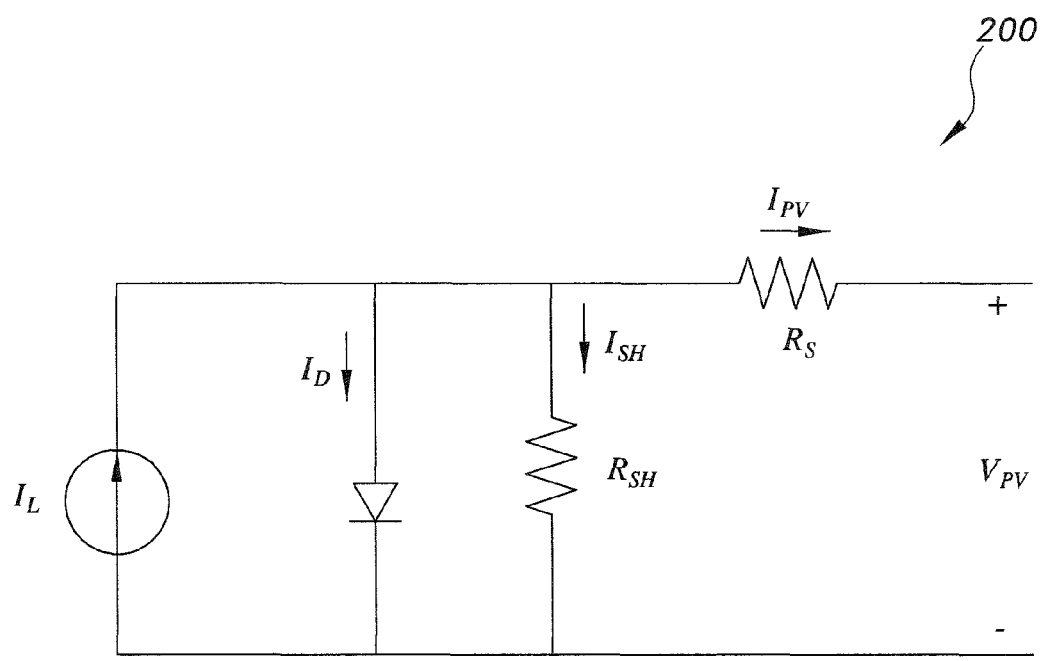
FIG. 2 is a schematic diagram of an equivalent circuit of a photovoltaic (PV) power source.

FIG. 2 shows the schematic of an equivalent electric circuit model 200 of an exemplary PV device used in the present system 90. It includes a current source that is light dependent, a p-n junction diode, one series resistance, and a parallel resistance. Simply using Kirchhoff's current law results in:

$$I_{PV} = I_L - I_D - I_{SH}, \quad (1)$$

where $I_D$ and $I_{SH}$ depict the diode and shunt branch currents, respectively, as given by:

$$I_D = I_0 \left\{ \exp\left[ \frac{V_{PV} + I_{PV} R_S}{a} \right] - 1 \right\} \quad (2)$$

and $$I_{SH} = \frac{V_{PV} + I_{PV} R_S}{R_{SH}}. \quad (3)$$

Putting these expressions of $I_D$ and $I_{SH}$ into equation (1) gives the complete I-V relationships of a PV panel:

$$I_D = I_L - I_0 \left\{ \exp\left[ \frac{V_{PV} + I_{PV} R_S}{a} \right] - 1 \right\} - \frac{V_{PV} + I_{PV} R_S}{R_{SH}}, \quad (4)$$

where $I_L$ is the light-generated current, $I_0$ is the diode saturation current, $R_S$ and $R_{SH}$ are the series and parallel resistance, respectively, and factor a is the diode modified ideality factor. To get the required voltage and current, PV panels can be connected either in series, in parallel, or in a combination of series and parallel. The series and parallel array is the most commonly used because of its flexibility in maintaining the required output voltage and current, and better performance in partially shaded conditions. Eq. (4) can be modified to represent the I-V relationship of the array, and is written as:

$$I_{PV} = \quad (5)$$
$$N_{pp} * I_L - N_{pp} * I_0 \left\{ \exp\left[ \frac{V_{PV} + I_{PV} R_S * N}{N_{ss} * a} \right] - 1 \right\} - \left( \frac{V_{PV} + I_{PV} R_S * N}{R_{SH} * N} \right),$$

and $$N = \frac{N_{ss}}{N_{pp}}, \quad (6)$$

where $N_{SS}$ and $N_{PP}$ are the number of series and parallel connected panels, respectively.

Three power electronics blocks, namely, the buck converter 94, the bidirectional buck-boost converter 96, and a voltage source converter (VSC) 95 are used to integrate the system 90 to the capacitive energy storage 97 and to the grid 99, and hence three control blocks are provided. From the IC (Incremental Conductance)-based MPPT (Maximum Power Point Tracking) and buck converter controller circuit 300, shown in FIG. 3, observe that the first control block uses incremental conductance (IC) 302 to control the duty of the buck converter 94 and the MPPT. Incremental conductance circuits for maximum power point tracking are well known to those of ordinary skill in the art, and need not be described further. The second control block 96 controls the DC link voltage to a constant value for real power delivery, and the third control block implements P-Q control for VSC 95. This P-Q control can be set by the power management controller (PMC), which gives the grid operator freedom to adjust the frequency or voltage deviation from the nominal values by adjusting the active and reactive power set points. During grid fault, the power generated from the PV array 92 will be stored in the SCESS 97. That helps the system 90 to ride through the fault.

The function of the Buck Converter Controller 304 (shown in FIG. 3) is to force the PV array 92 to change its operating point under varying irradiation and temperature; to locate the MPPT as it tracks and extracts the maximum possible power from the PV array 92 under different operating conditions; and to improve the overall efficiency of the complete PV system. Different MPPT design methods have been presented over the years. These include Perturb and Observe (P&O); Incremental Conductance (IC); and artificial intelligence techniques, such as Artificial Neural Networks (ANNs) and Fuzzy Logic control. The methods widely used by many researchers are IC and P&O, due to their simplicity. The IC method is used in the present fault ride-through and power smoothing system 90 because of its simplicity, in order to locate the maximum power point (MPP) by calculating the PV power at each instant, and to change the PV array's operating point to capture the maximum available power. The PV output power is given by P=VI, and from the rule of the IC method, the derivative of the PV power will be zero at the maximum operating point. Applying the chain rule of derivatives yields:

$$\frac{\partial P}{\partial V} = \frac{\partial (VI)}{\partial V} = 0. \quad (7)$$

Rearranging the terms, equation (7) could be written as:

$$\frac{\partial I}{\partial V} = \frac{-I}{V}. \quad (8)$$

Figure 3:
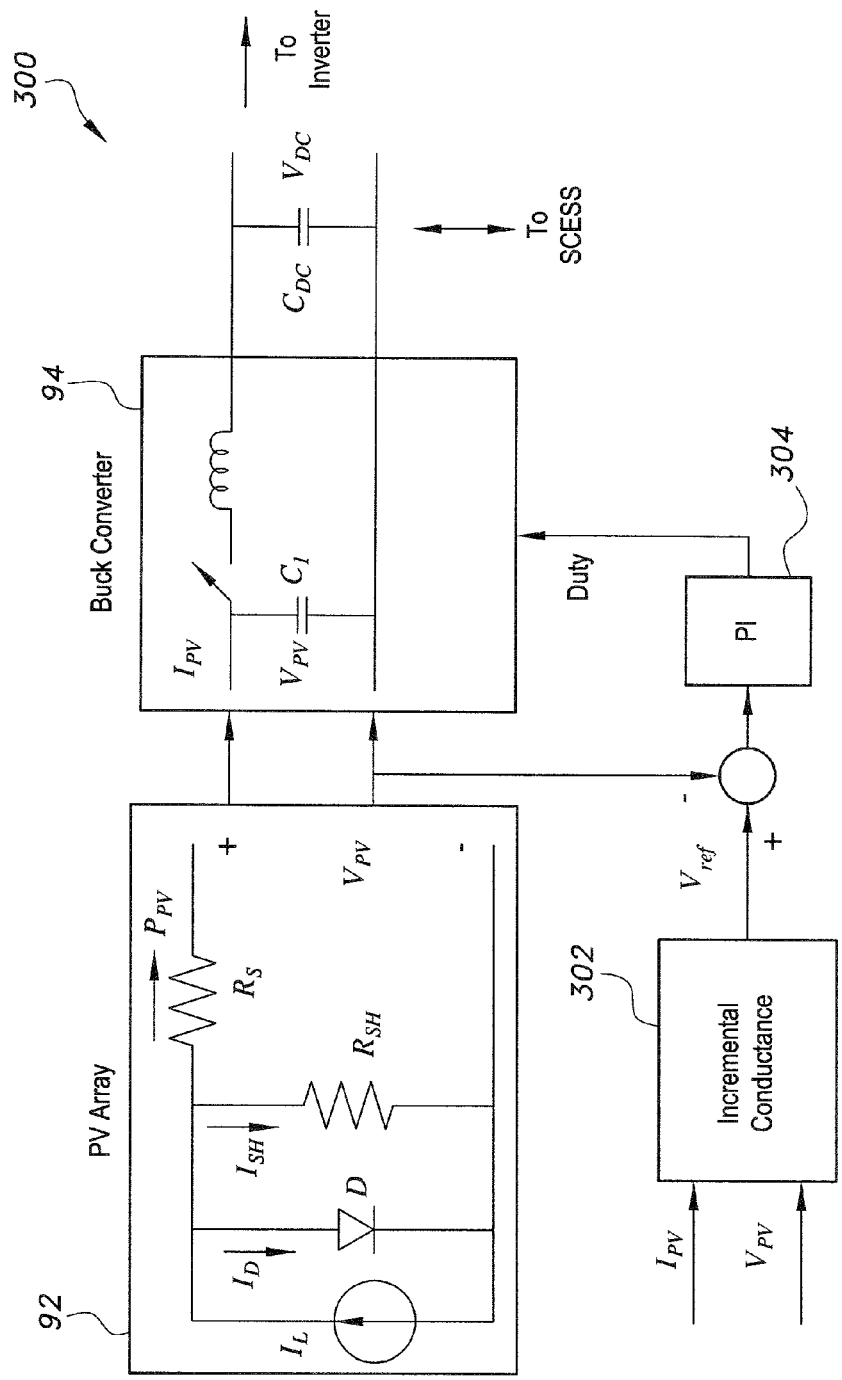
FIG. 3 is a block diagram illustrating an IC-Based (Incremental Conductance-based) MPPT and a buck converter controller connected to the equivalent circuit of FIG. 2.

The duty cycle of the buck converter 94 is controlled by MPPT based on IC 302 until equation (8) is satisfied. Input of the IC-based MPPT is the PV array's output voltage $V_{PV}$ and current $I_{PV}$, and its output is the reference voltage, $V_{ref}$, as shown in FIG. 3. This voltage will be compared with $V_{PV}$, and the difference will be processed by PI (proportional-integral) regulator 304. After comparison of a high frequency carrier signal with the output of the PI (which is the Duty signal), a firing pulse will be generated for the buck converter 94. The DC link voltage $V_{DC}$ will be the Duty multiplied by the PV array output voltage, $V_{PV}$. The DC link capacitor $C_{DC}$ removes the offset of this voltage.

Figure 4:
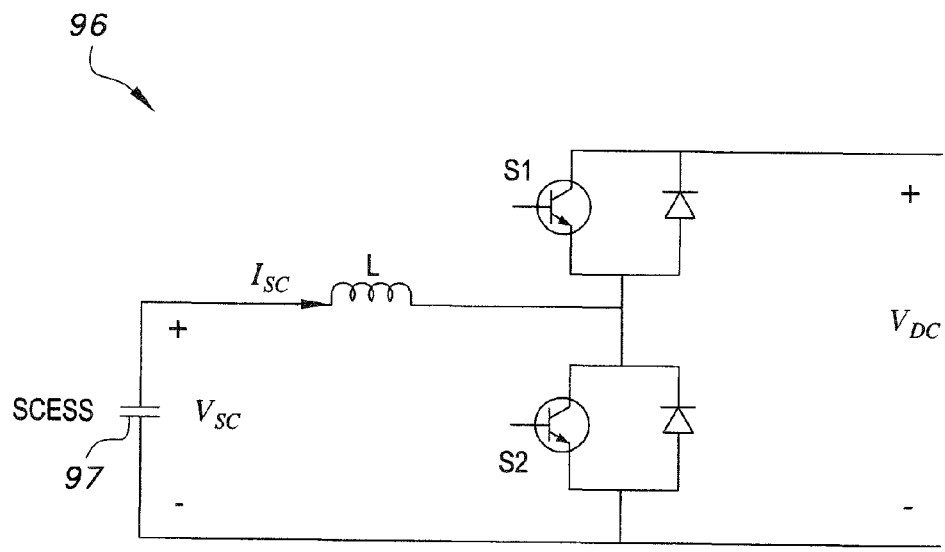
FIG. 4 is a schematic diagram illustrating a buck-boost converter connected to the supercapacitor energy storage system (SCESS) of FIG. 1.

The topology of the bidirectional buck-boost converter 96 is shown in FIG. 4. The bidirectional converter acts as a buck converter to charge supercapacitors of the SCESS 97 in one direction, and as a boost converter to transfer energy to the DC link capacitor 98 in the other direction. The operation of the converter 96 is controlled by the DC link voltage and the voltage of the SCESS supercapacitor(s) 97. The main purpose of the bidirectional buck-boost converter 96 is to maintain the voltage of the DC link capacitor 98 relatively constant at a reference value. To make this buck-boost converter control stable, a lower limit is placed on the supercapacitor voltage, which is 50% of the maximum value $V_{SCmax}$, where $V_{SCmax}$ is the maximum supercapacitor voltage. The state of charge (SoC) controls the supercapacitor voltage to be between 0.5 $V_{SCmax}$ and $V_{SCmax}$. Between these two voltages, 75% of the energy stored can be utilized. The inductor L is designed from the boost mode using a duty cycle of about 0.5, so that:

$$V_{DC} = \frac{V_{SC}}{1-d}. \quad (9)$$

When switch $S_2$ is on, the inductor ripple current is:

$$\Delta I_{L(on)} = \left(\frac{V_{SC}}{L}\right) T_{on}, \quad (10)$$

and when it is off, the current is:

$$\Delta I_{L(off)} = \left(\frac{V_{SC} - \frac{V_{SC}}{1-d}}{L}\right) T_{off}, \quad (11)$$

At steady state, $\Delta I_{L(on)} = \Delta I_{L(off)}$ and $T = T_{on} + T_{off} = 1/f_s$, so that:

$$\Delta I_L = \frac{V_{SC}}{L} dT \quad (12)$$

or $$L = \frac{V_{SC} dT}{\Delta I_L},$$

where, $V_{DC}$ is the DC link voltage, $V_{SC}$ is the supercapacitor voltage, d is the duty of the IGBT, $\Delta I_{L(on)}$ the ripple inductor current when $S_2$ is on, $\Delta I_{L(off)}$ the ripple inductor current when $S_2$ is off, $T_{on}$ on period of the IGBT, $T_{off}$ off period of the IGBT, T is the switching period and $f_s$ is the switching frequency.

Figure 5:
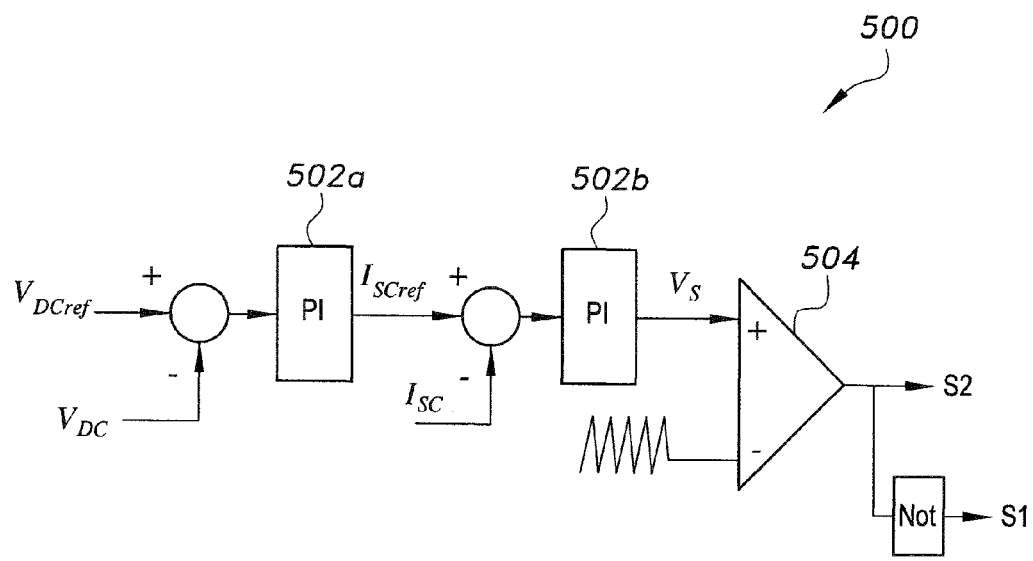
FIG. 5 is a block diagram of a controller circuit providing switching signals for the transistors in the buck boost converter of FIG. 4.

Two cascaded loops are implemented for the buck-boost converter controller 500, as shown in FIG. 5. The outer loop is a voltage control that controls the DC link voltage by comparing the measured DC link voltage with the reference, and via PI controller 502a, generates the reference supercapacitor current $I_{SCref}$. This reference current is compared with the actual inductor current $I_{SC}$ to generate the gating signals for the IGBTs (insulated gate bipolar transistors S1 and S2 in FIG. 4) using PI controller 502b. The output of the PI controller 502b is compared with a triangular wave 504 to generate the gating signals at its output. The reference current $I_{SCref}$ in Laplace transform is given as:

$$I_{SCref} = (V_{DCref} - V_{DC}) * \left(k_{PO} + \frac{k_{IO}}{s}\right), \quad (13)$$

The control signal $V_S$ in Laplace transform is given by, $$V_S = (I_{SCref} - I_{SC}) * \left(k_{PI} + \frac{k_{II}}{s}\right), \quad (14)$$

where, $k_{P's}$, are the proportional and $k_{I's}$ are the integral constants for the buck boost converter given in Table 1. The size of the supercapacitor is chosen depending on the amount of energy required to minimize the fluctuation from the PV source. From FIG. 1, we derive the relationship:

$$P_g = P_{pv} \pm P_{SC}, \quad (15)$$

If the power demand from the grid or load connected to the AC side is less than the power generated from the PV array, the excess energy will be stored in the SCESS supercapacitor for later use when the power demand from the PMC is high. During fault on the grid side, the generated power from the PV array will be stored in the SCESS 97, and it will be used to ride through the fault by supporting active and reactive power to the grid 99.

Figure 6:
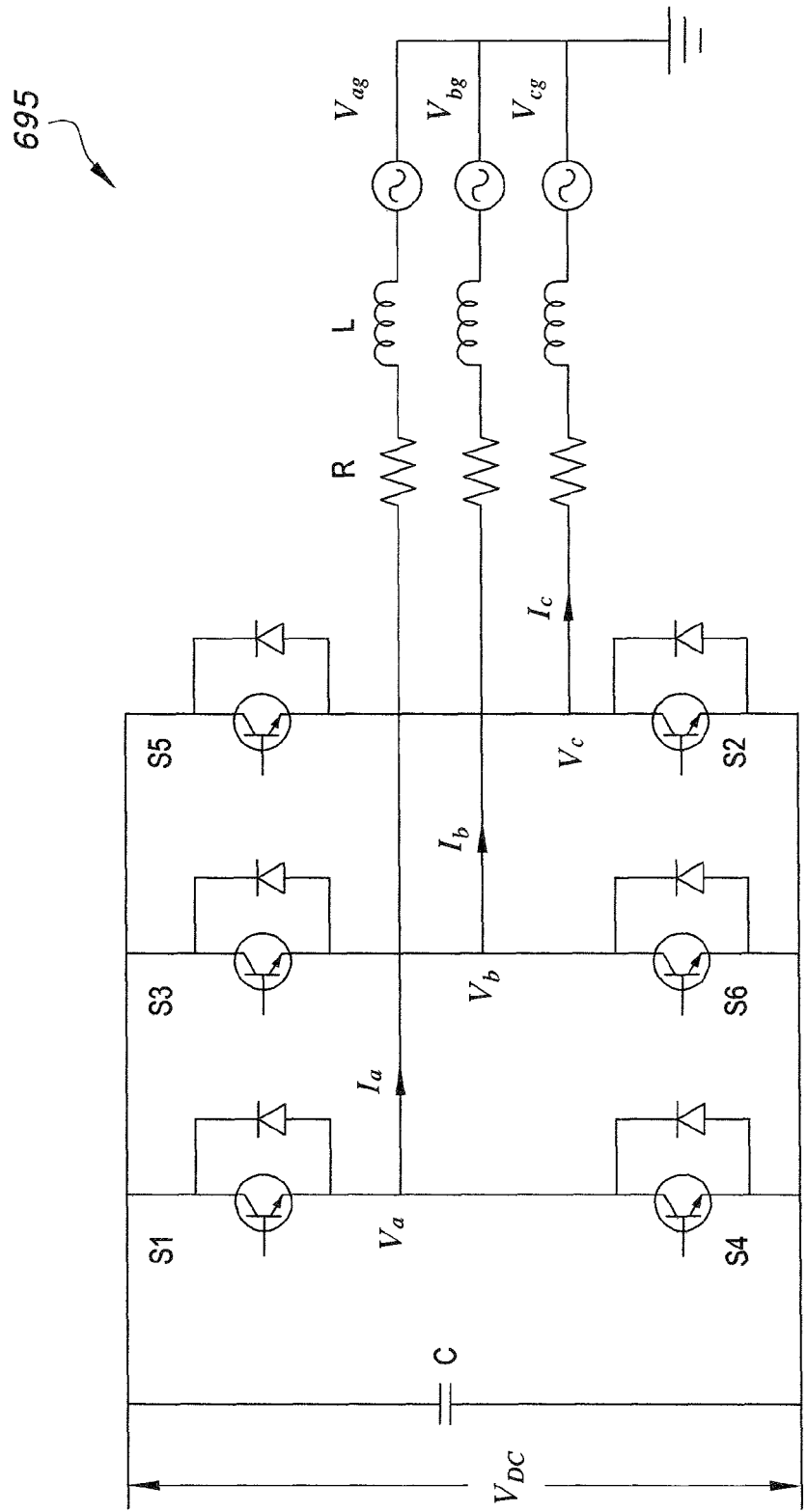
FIG. 6 is a schematic diagram illustrating an exemplary two-level, three-phase inverter used in the voltage source converter (VSC) of FIG. 1.
Figure 7:
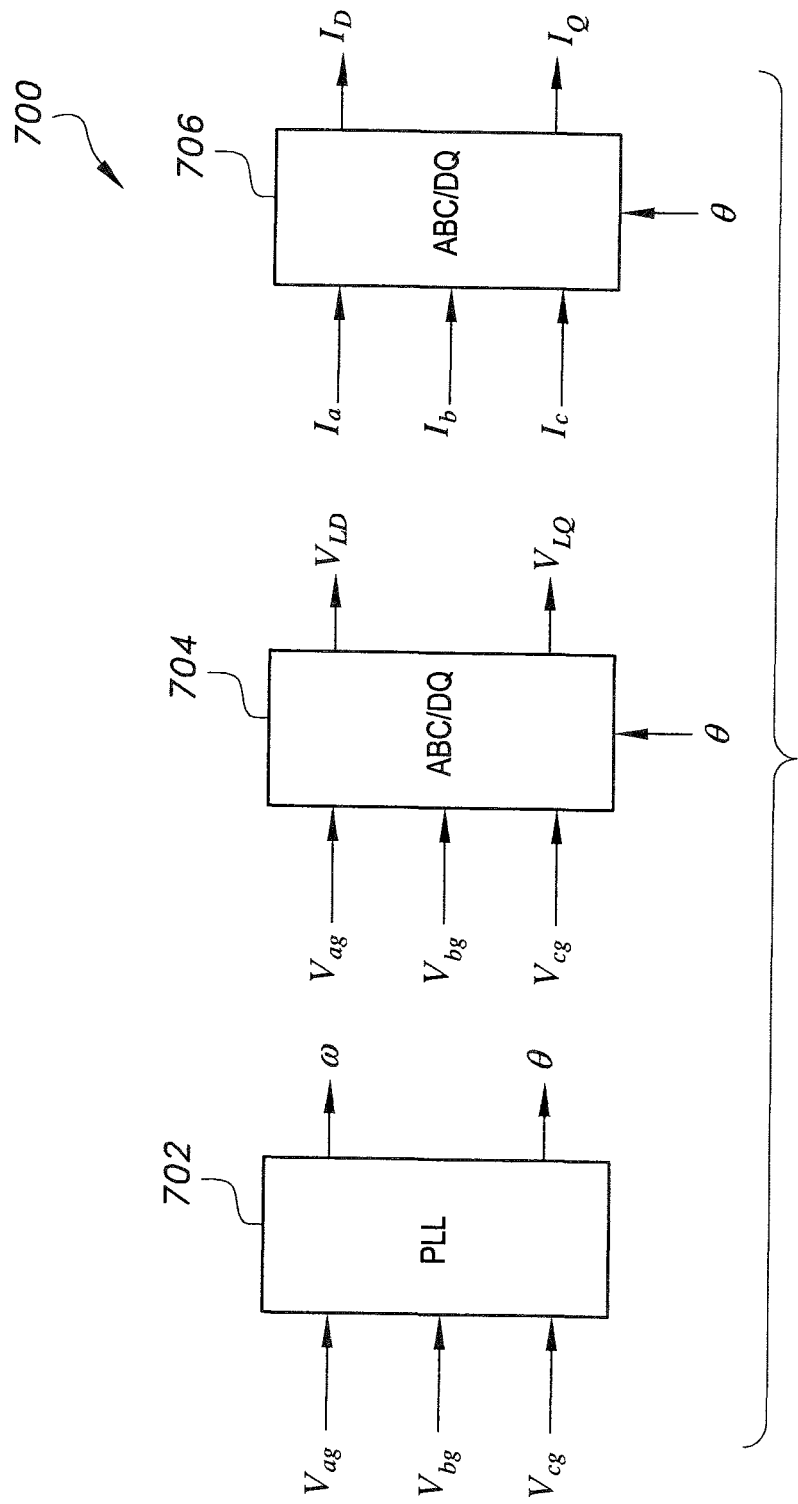
FIG. 7 is a block diagram of a phase-locked loop and ABC to DQ conversion circuit connected to the inverter of FIG. 6.
Figure 8:
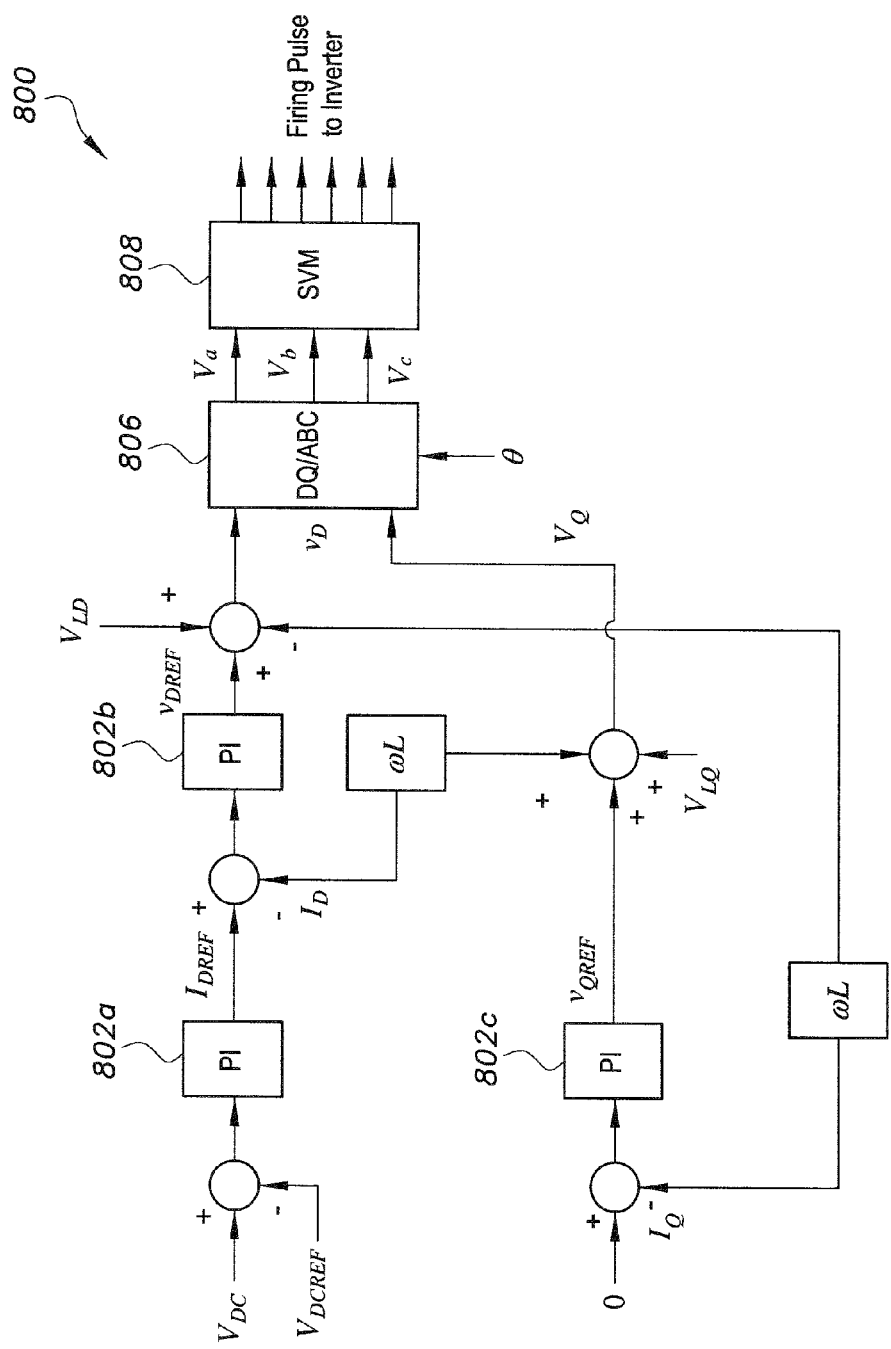
FIG. 8 is a block diagram illustrating a decoupled P-Q inverter controller for generating switching signals for the transistors in the inverter of FIG. 6.

Referring to FIGS. 6-8, with respect to the P-Q Controller 700 for the VSC 95, the available DC link power has to be converted to three-phase AC power to supply either AC loads or for grid integration using an inverter 695, shown in FIG. 6. Depending on the grid power demand or AC load, a P-Q controller is implemented for the inverter 695. The three-phase voltage equations can be written as:

$$RI_a + L\frac{dI_a}{dt} = V_a - V_{ag} \quad (16)$$

$$RI_b + L\frac{dI_b}{dt} = V_b - V_{ag},$$

$$RI_c + L\frac{dI_c}{dt} = V_c - V_{ag}$$

where, R and L are resistance and inductance of the distribution line, respectively; $I_a$, $I_b$ and $I_c$ are the distribution line currents; $V_a$, $V_b$, $V_c$ are the inverter output voltages; $V_{ag}$, $V_{bg}$, $V_{cg}$ are the grid voltages. Using a synchronous rotating reference frame (D-Q axis), decoupled active and reactive current control technique is implemented using a standard PI (proportional-integral) controller. In the current control technique, the active current component $I_D$ controls the active power, and reactive power flow is regulated by controlling $I_Q$. The PI controllers force these currents to track certain reference commands, $I_{DREF}$ and $I_{QREF}$, respectively. Utilizing the instantaneous power theory, we derive the following relationships:

$$P_{dc} = P_g \quad (17)$$

$$P_g = \frac{3}{2}(V_{LD}I_D + V_{LQ}I_Q),$$

$$Q_g = \frac{3}{2}(V_{LQ}I_D - V_{LD}I_Q)$$

where $P_{dc}$ is the DC link capacitor power, and $P_g$ and $Q_g$ are the grid side active and reactive power, respectively. The power reference signals for the active and reactive power controllers are obtained from the PMC. If the reference active and reactive powers are known, the respective $I_{DREF}$ and $I_{QREF}$ currents are determined from equation (17) as:

$$I_{DREF} = \frac{2}{3}\left(\frac{P_{REF}V_{LD} - Q_{REF}V_{LQ}}{V_{LD}^2 + V_{LQ}^2}\right), \quad (18)$$

and $$I_{QREF} = \frac{2}{3}\left(\frac{P_{REF}V_{LQ} + Q_{REF}V_{LD}}{V_{LD}^2 + V_{LQ}^2}\right). \quad (19)$$

A phase locked loop (PLL) 702 is implemented to track the grid frequency ($\omega = 2\pi f$) and phase angle $\theta$ that will be used as input to the ABC-to-DQ voltage converter 704 and the ABC-to-DQ current converter 706, as shown in FIG. 7.

The schematic for the P-Q controller is shown in FIG. 8. Since the D and Q components are coupled, cross-coupling terms and feed forward voltages are used to improve the performance of the PI current controllers. The D-axis component control signal in the Laplace domain is:

$$V_D = \left(k_{P1D} + \frac{k_{I1D}}{s}\right) * (I_{REF} - I_D) + V_{LD} + \omega L I_D. \quad (20)$$

The Q-axis component control signal in the Laplace domain is:

$$V_Q = \left(k_{P2Q} + \frac{k_{I2Q}}{s}\right) * (I_{QREF} - I_Q) + V_{LQ} - \omega L I_Q, \quad (21)$$

where, $k_{P's}$ are the proportional constants and $k_{I's}$ are the integral constants given in Table 1.

As shown in FIG. 8, a first PI controller 802a performs PI control on the difference between DC voltage $V_{DC}$ and reference DC voltage $V_{DCREF}$. The output of PI controller 802a provides a current reference $I_{DREF}$. A second PI controller 802b performs PI control (outputting $V_{DREF}$) on the difference between $I_{DREF}$ and $I_D$, where $I_D$ is a function of inductive reactance $\omega L$ summed with output $V_{QREF}$, provided by third PI controller 802c, and $V_{LQ}$, a quadrature output voltage. Inputs to the third PI controller 802c are the difference between zero reference current and $I_Q$, a quadrature output current produced from inductive reactance $\omega L$. The sum ($V_{QREF} + \omega L + V_{LQ}$) forms a first input to DQ/ABC converter 806. The sum ($V_{DREF} + V_{LD}$, a direct output voltage, $-\omega L$) forms a second input to the DQ/ABC converter 806. The three-phase voltage outputs, $V_a$, $V_b$, $V_c$, of the DQ/ABC converter 806 are fed as input to a space vector modulator (SVM) 808, the output of which forms the firing pulse (PWM [pulse width modulated]) control input to the VSC inverter 695 (shown in FIG. 6).

TABLE 1

Values of PI Parameters and Other Components

| For inverter | | For buck converter | | For buck-boost converter | |
|---|---|---|---|---|---|
| Parameter | Value | Parameter | Value | Parameter | Value |
| $k_{P1D}$ | 0.7 | $K_P$ | 0.6 | $k_{PO}$ | 0.4 |
| $K_{I1D}$ | 0.2 | $K_I$ | 0.2 | $k_{IO}$ | 0.5 |
| $k_{P2D}$ | 0.5 | | | $k_{PI}$ | 0.5 |
| $K_{I2D}$ | 15 | | | $k_{II}$ | 0.5 |
| $k_{P2Q}$ | 5 | | | SCESS | 22F |
| $K_{I2Q}$ | 0.5 | | | L | 0.8 mH |
| Coupling | 1.35 mH | | | | |

TABLE 1-continued

Values of PI Parameters and Other Components

| For inverter | | For buck converter | | For buck-boost converter | |
|---|---|---|---|---|---|
| Parameter | Value | Parameter | Value | Parameter | Value |
| inductance L DC link capacitor $C_{DC}$ | 80 mF | | | | |

Figure 9:
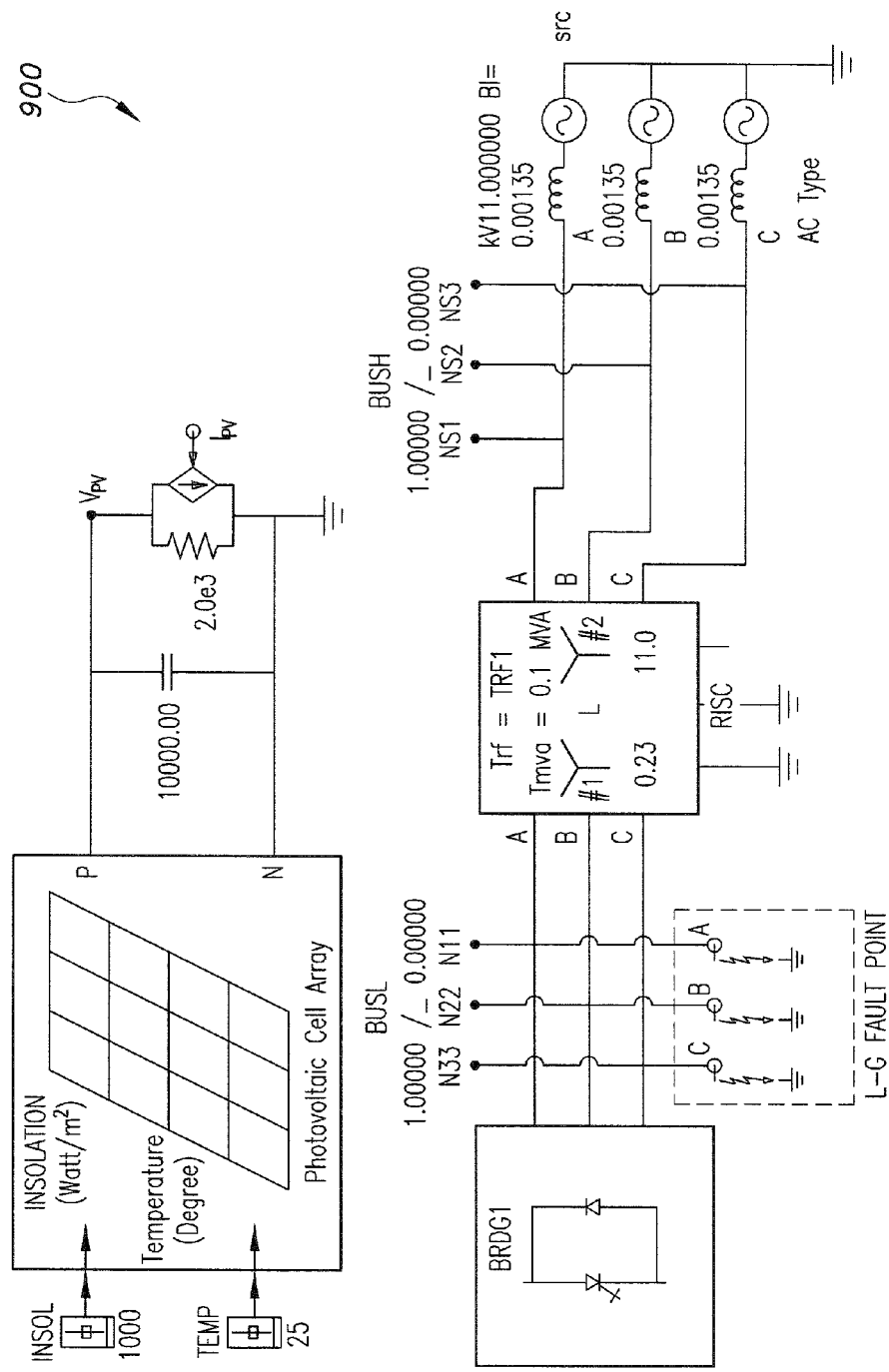
FIG. 9 is a block diagram illustrating an RSCAD model of the fault ride-through and power smoothing system of FIG. 1 with a fault applied to the grid for RTDS testing.
Figure 10:
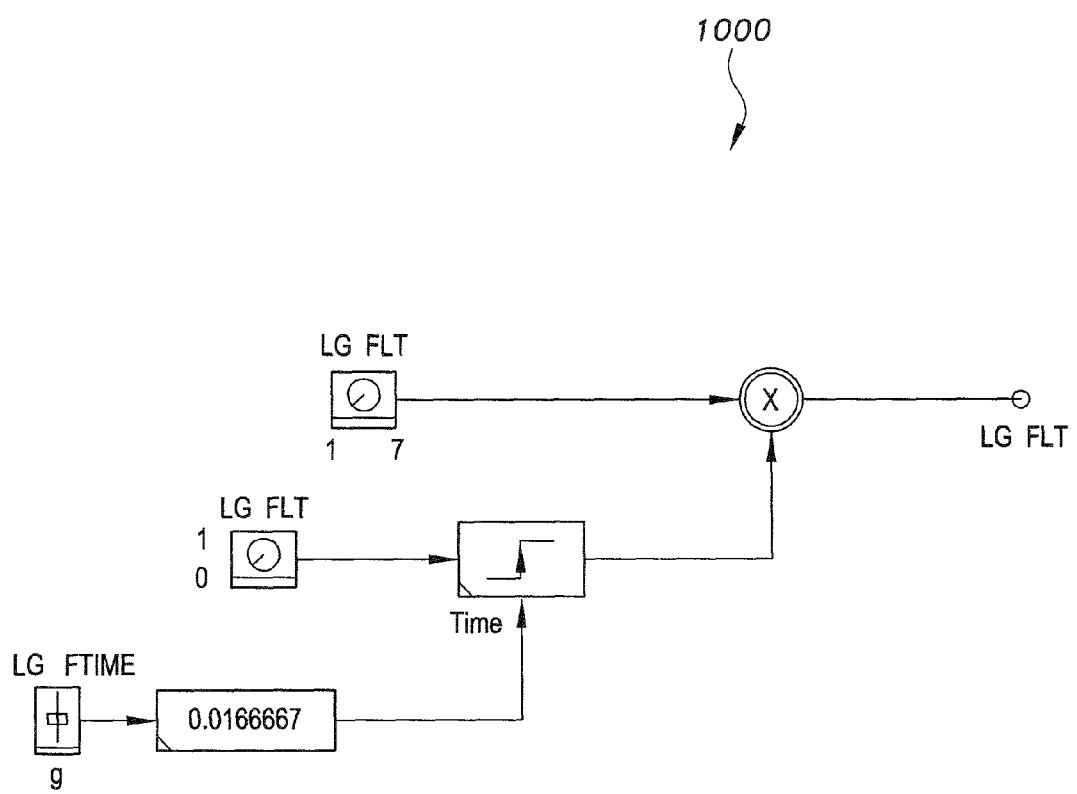
FIG. 10 is a block diagram showing the three-phase to ground fault controller for applying the fault in FIG. 9.

To evaluate the system 90, a PV array with the specifications given in Table 2 is developed in RTDS (Real Time Digital Simulator). It includes 50 series-connected and 20 parallel-connected PV modules. FIG. 9 shows the complete RTDS model 900 of the grid-connected PV system used. FIG. 10 shows the applied three-phase fault 1000. For the reference solar intensity of 1000 W/m² and temperature of 25° C., the operating voltage $V_{MP}$ and current $I_{MP}$ at the MPPT will be 50×17.4 V=870 V, and 20×3.05 A=61 A, respectively. The expected maximum output power at this operating point from this PV array is 53 kW (870 V×61 A). The P-Q controller from the PMC is set to 50 kW, and if the irradiation or temperature varies, this set point can be varied accordingly to transfer the generated power directly to the grid. During a fault at the grid side, the generated power from the PV array will be stored in the SCESS. The power stored in the SCESS helps the system ride through the fault by providing active and reactive power.

TABLE 2

Parameters of RTDS PV Panel

| Parameter | Value |
|---|---|
| Open Circuit Voltage | 21.7 V |
| Short circuit current | 3.35 A |
| Voltage at PMAX | 17.4 V |
| Current at PMAX | 3.05 A |
| Series connected modules | 50 |
| Parallel connected modules | 20 |
| Number of PV cells in each model | 36 |
| Ideality factor of PV diode | 1.5 |
| Temperature Dependancy factor | 3 |
| Reference Temperature | 25° C. |
| Temperature Coefficient of ISC | 0.065 |
| Reference solar intensity | 1000 W/m² |

To demonstrate the effectiveness of the present controller for fault ride through and power smoothing, the following tests have been applied. (a) Normal operation at 1000 W/m² and 25° C., and the grid demand power is 50 kW; (b) Three-phase fault is applied at the grid side.

Figure 11:
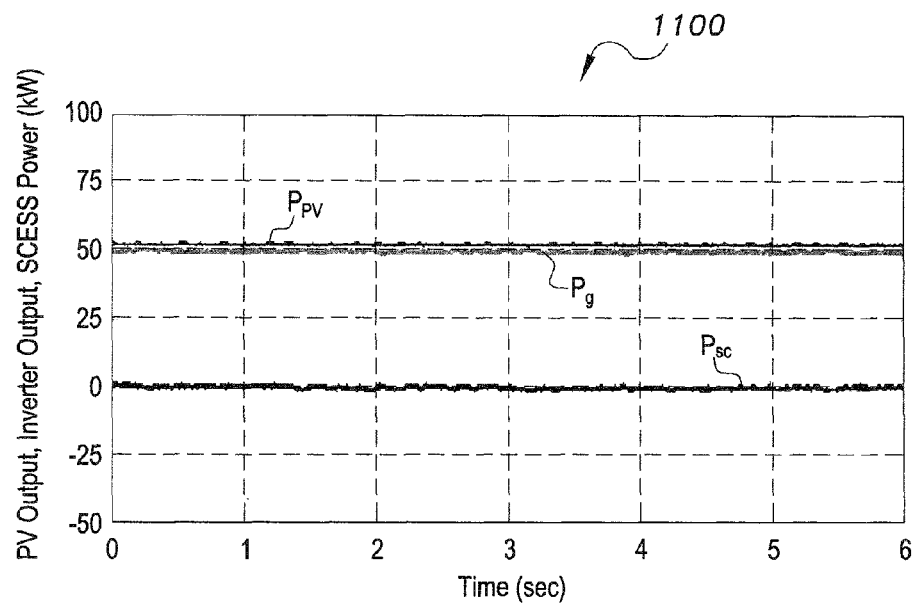
FIG. 11 is a plot illustrating the PV array output power $P_{PV}$, inverter output power $P_g$ and supercapacitor power $P_{sc}$ in RTDS testing.
Figure 12:
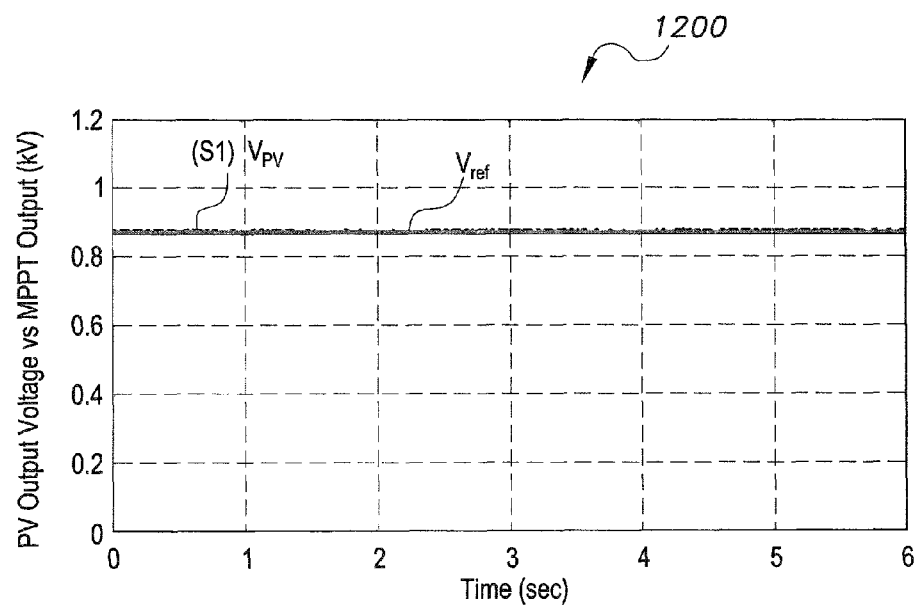
FIG. 12 is a plot illustrating PV array output voltage $V_{PV}$ and MPPT output voltage $V_{ref}$ in RTDS testing.
Figure 14:
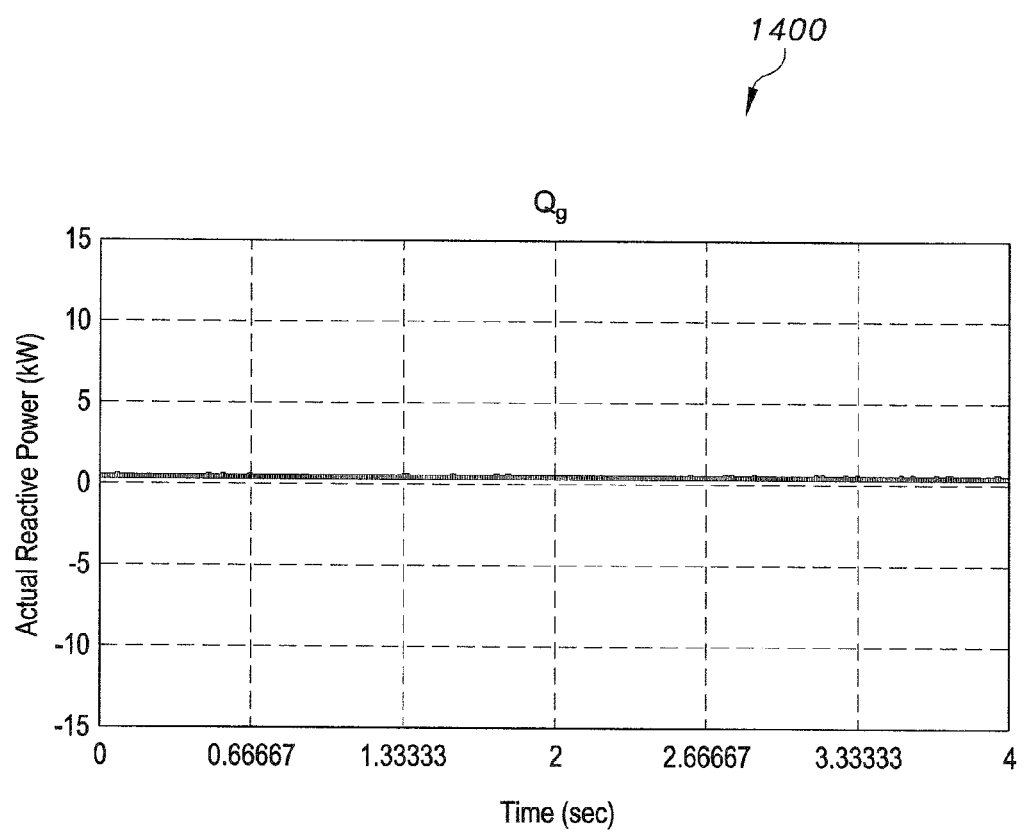
FIG. 14 is a plot illustrating actual grid reactive power in RTDS testing.

For normal operation without energy storage, the power generated from the PV array is directly transferred to the grid. Depending on the irradiation, the PMC will set the P-Q powers for the inverter so that it can transfer the power generated to the grid. For our case, we have set the irradiation and temperature at 1000 W/m² and 25° C. respectively. That means the PV array is generating 53 kW. The P-Q set values are 50 kW and 0 volt-ampere reactive (var), respectively. Only around 3 kW is being exchanged between the DC link and the SCESS to compensate for the losses. The applied disturbance and response of the system are presented in plots 1100, 1200, 1300a, 1300b, 1300c, and 1400 of FIGS. 11, 12, 13A, 13B, 13C, and 14, respectively. The present MPPT controller tracks the maximum voltage from the PV array, and maximum power $P_{PV}$ is generated. The P-Q controller for the inverter transfers 50 kW to the grid, as shown in FIG. 11. FIG. 12 shows the output of the IC based MPPT controller output voltage $V_{ref}$, and shows how the buck converter controller forces the PV array to track the maximum voltage $V_{PV}$. The DC link voltage, which is common for both the inverter and the buck boost converter, is the duty of the buck converter multiplied by the PV array output voltage $V_{PV}$, and is kept constant by the buck-boost controller. A voltage of 650V is used as a reference constant DC link voltage, and the dc current varies, depending on the change in irradiation and temperature. The PV array output power is always $V_{PV} \times I_{PV}$, and the P-Q controller transfers $V_{DC} \times I_{DC}$, as shown in FIGS. 13A-13C. The actual grid reactive power for a reference of 0 var is shown in FIG. 14.

Figure 15:
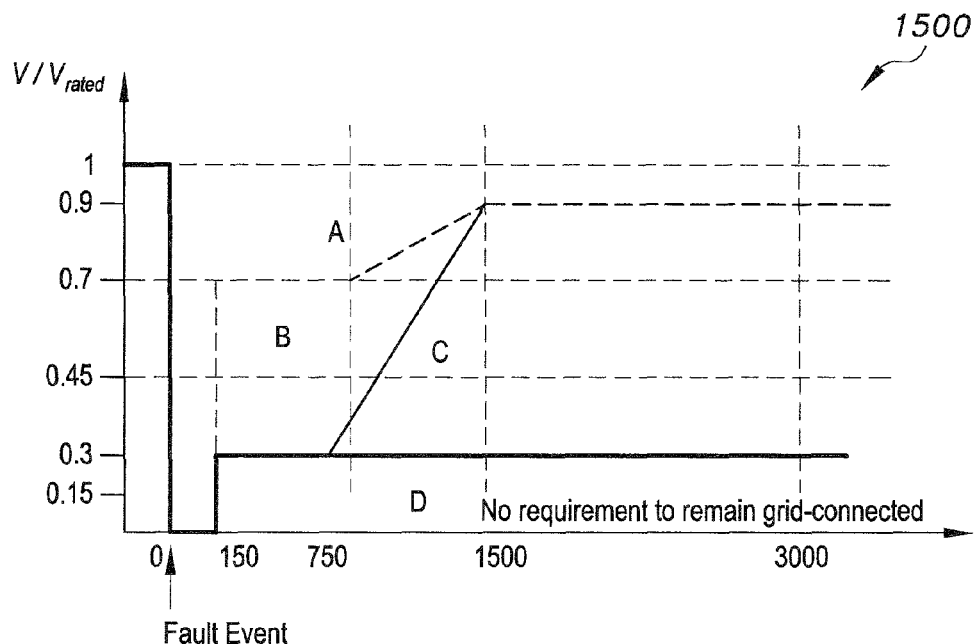
FIG. 15 is a plot illustrating the low voltage ride-through (LVRT) curve response of the system of FIG. 9 in RTDS testing.

The limiting curve 1500 of the power plant is shown in FIG. 15. For fault duration of ≤150 ms, the power plant must remain online for a voltage drop down of 0 pu. For zones A and B, the plant should remain online. In zone C, a short-time disconnection can be carried out and no requirement for the plant to remain online for zone D. A three-phase fault of nine cycles (150 msec) is applied on the grid side. For comparison, two systems have been developed, one with SCESS and the other without energy storage in RTDS.

Figure 16:
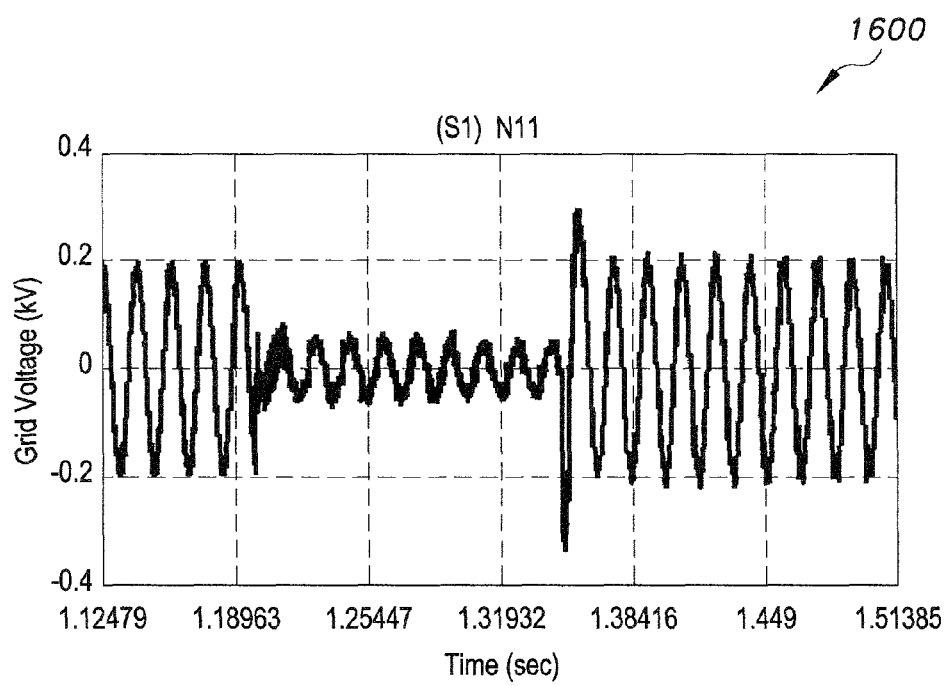
FIG. 16 is a plot illustrating grid voltage after a three phase fault is applied in the system of FIG. 9 in RTDS testing.
Figure 17:
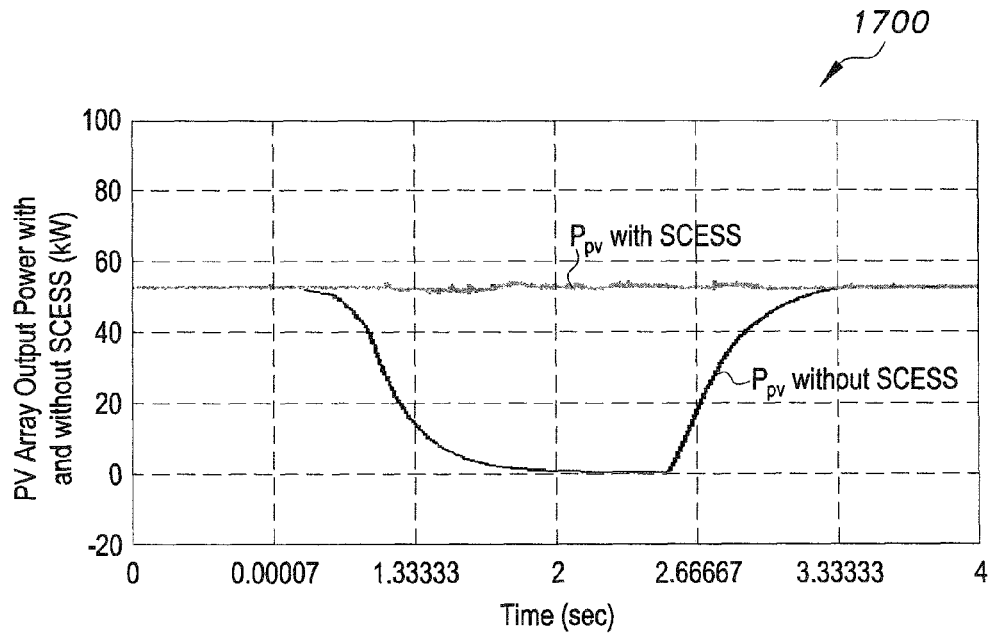
FIG. 17 is a plot illustrating PV array power $P_{PV}$ with SCESS and with no energy storage in the system of FIG. 9 in RTDS testing.
Figure 18:
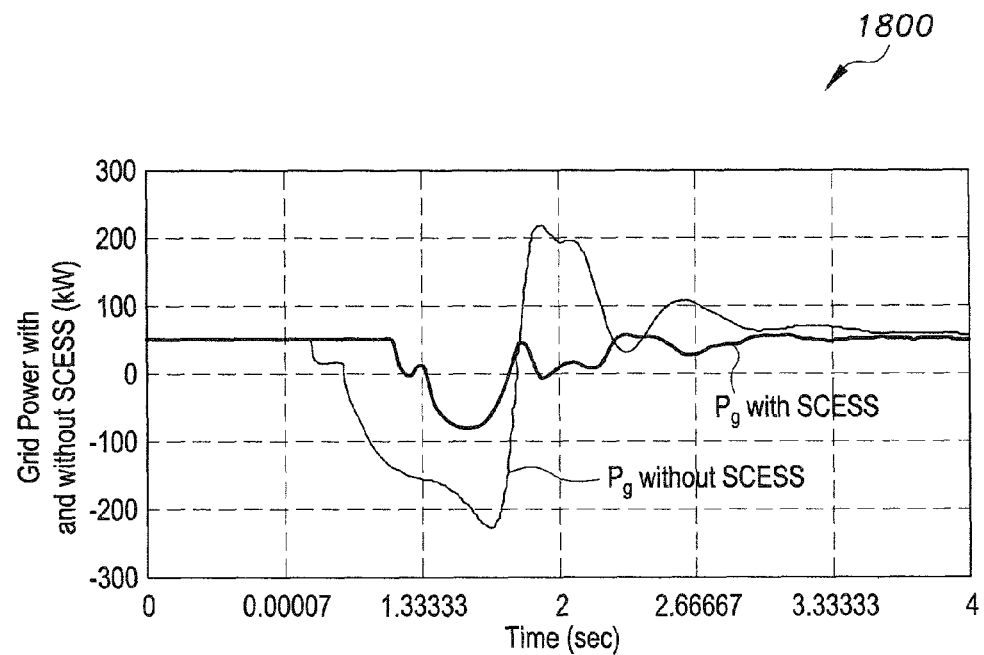
FIG. 18 is a plot illustrating grid active power $P_g$ for a three-phase fault with and without energy storage in the system of FIG. 9 in RTDS testing.
Figure 19:
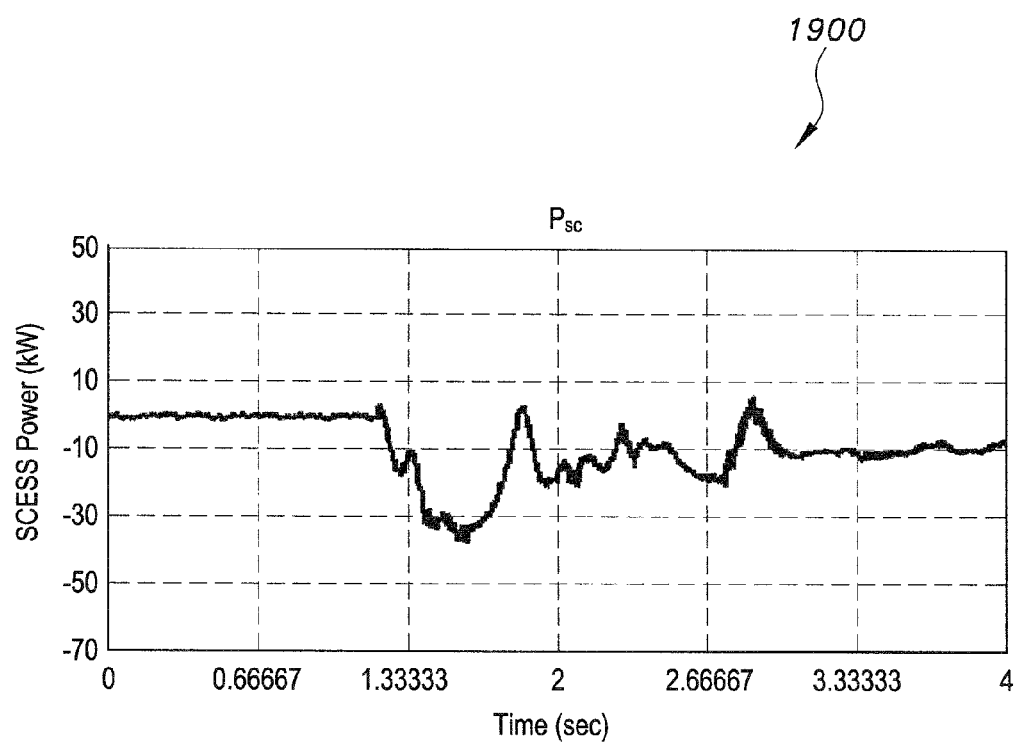
FIG. 19 is a plot illustrating SCESS power $P_{SC}$ for the applied fault on the grid side in the system of FIG. 9 in RTDS testing.
Figure 20:
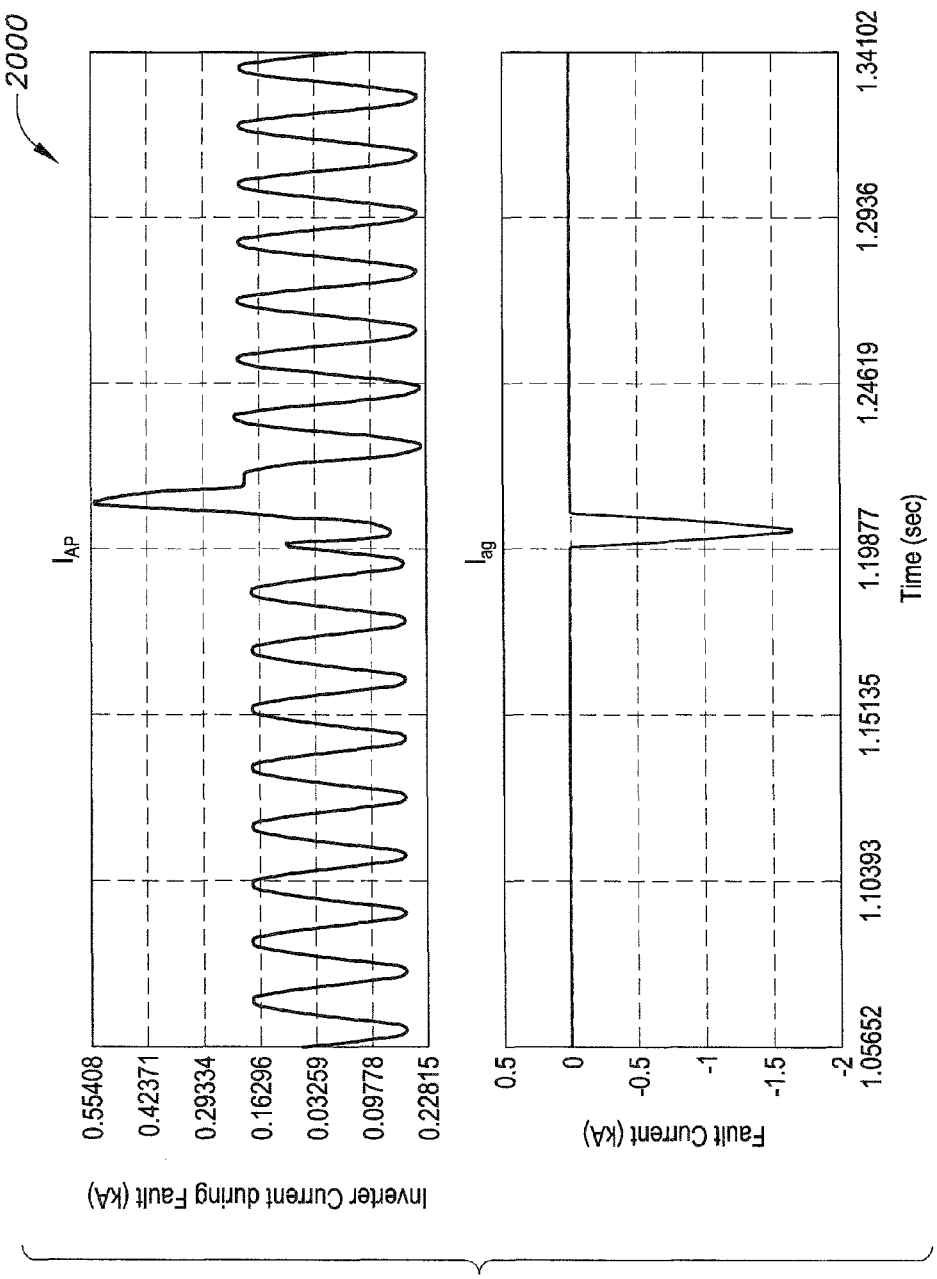
FIG. 20 are plots illustrating inverter and related fault currents in the system of FIG. 9 in RTDS testing.
Figure 21:
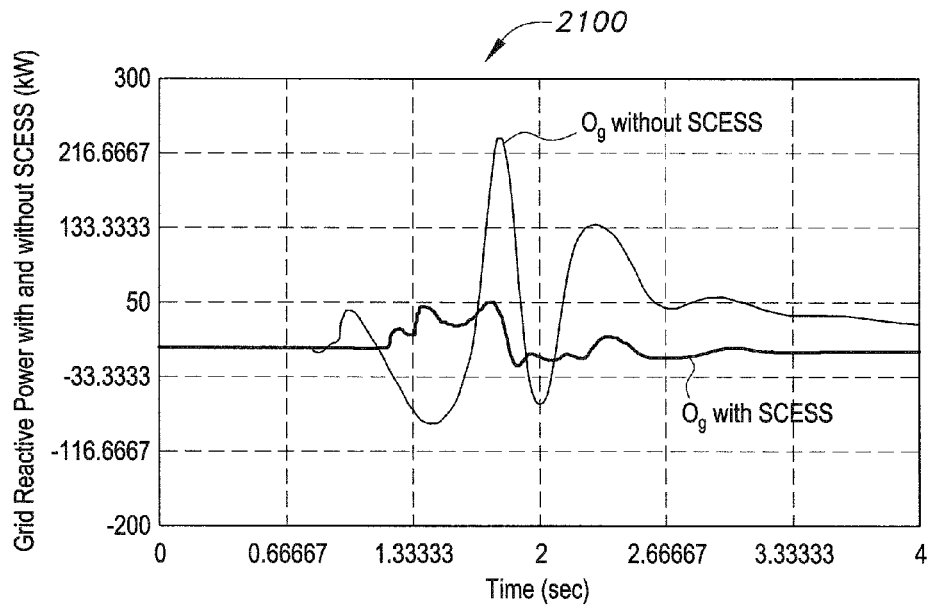
FIG. 21 is a plot illustrating grid reactive power $Q_g$ during the three-phase fault in the system of FIG. 9 in RTDS testing.
Figure 22:
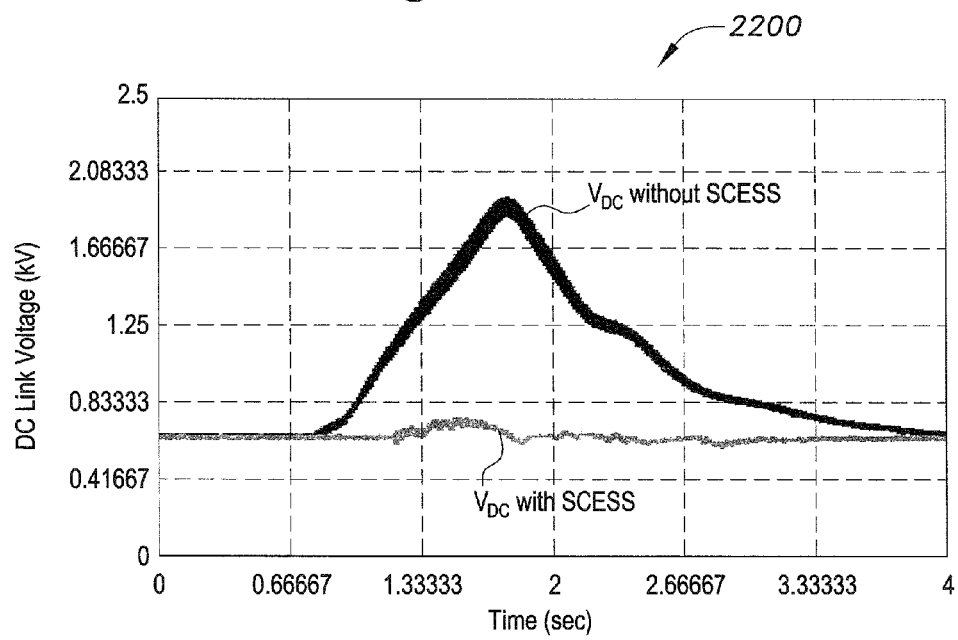
FIG. 22 is a plot illustrating the DC link voltage for the applied fault in the system of FIG. 9 in RTDS testing.
Figure 23:
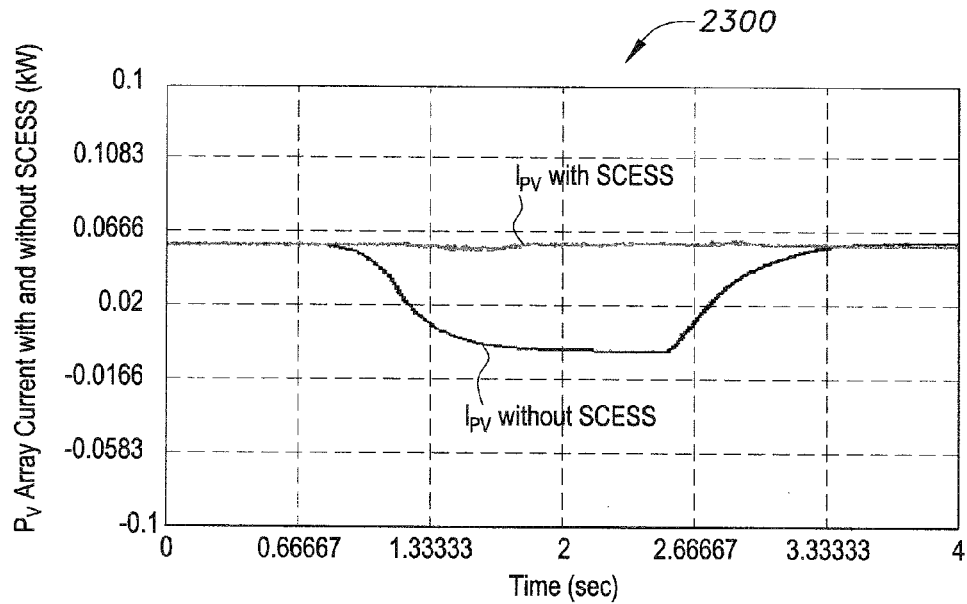
FIG. 23 is a plot illustrating the PV output current $I_{PV}$ after the three-phase fault in the system of FIG. 9 in RTDS testing.
Figure 24:
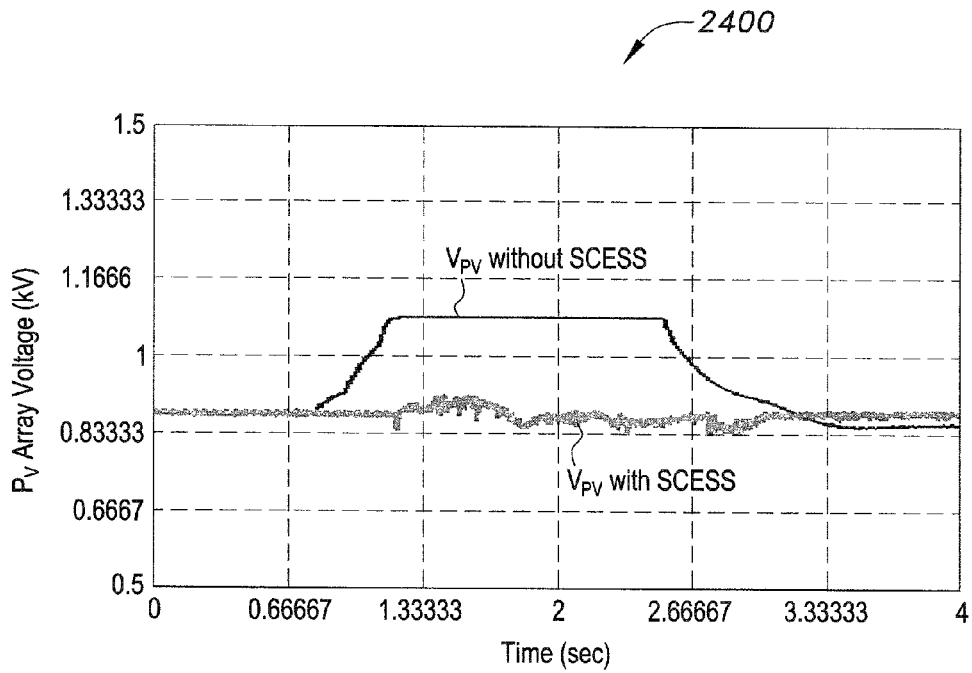
FIG. 24 is a plot illustrating the PV array voltage $V_{PV}$ during the three-phase fault in the system of FIG. 9 in RTDS testing.
Figure 25:
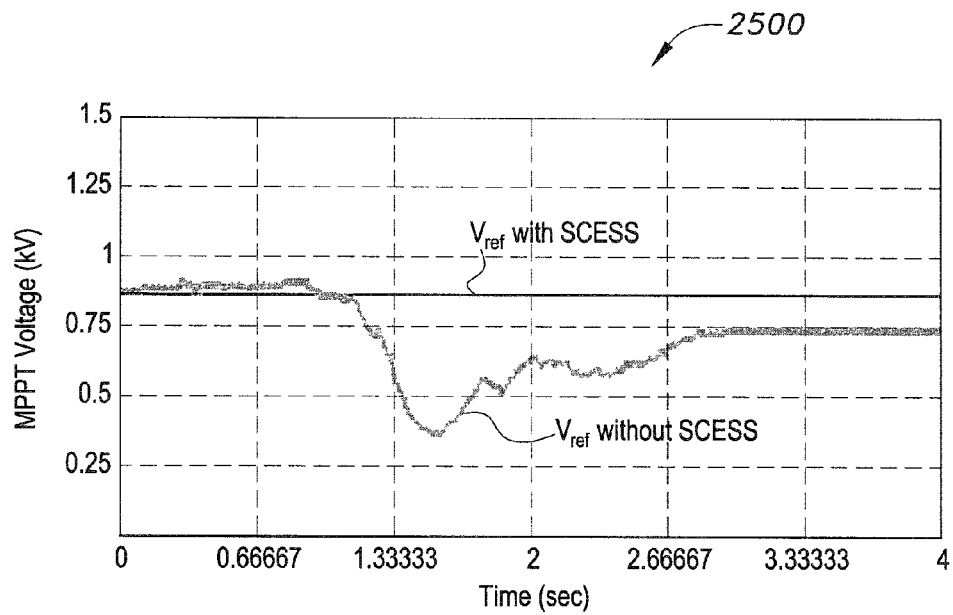
FIG. 25 is a plot illustrating the MPPT output voltage $V_{ref}$ for the applied fault in the system of FIG. 9 in RTDS testing.
Figure 26:
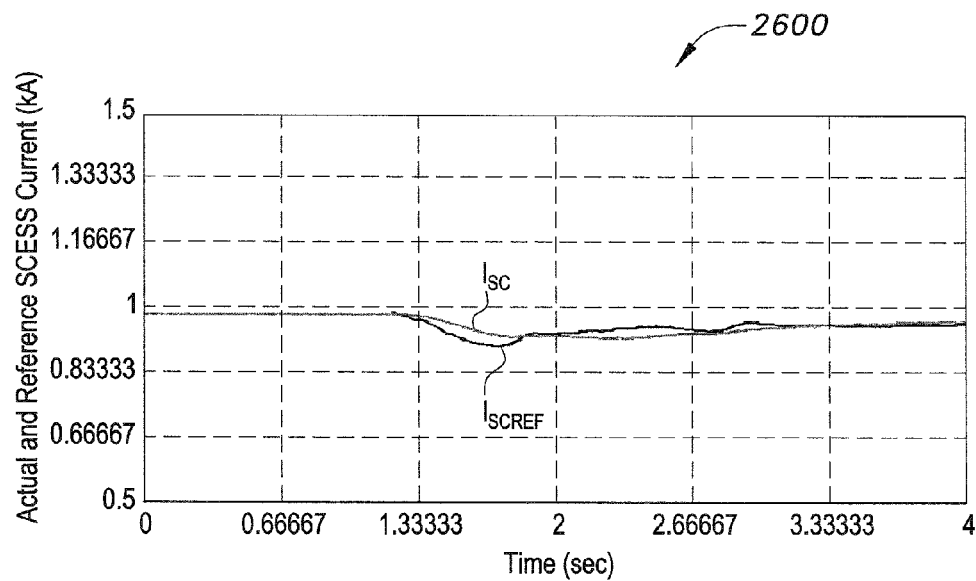
FIG. 26 is a plot illustrating actual and reference SCESS current during the three-phase fault in the system of FIG. 9 in RTDS testing.

The response of the system for the applied fault is depicted in plots 1600 through 2500 of FIGS. 16 through 25, respectively. The grid voltage after the described fault is shown in FIG. 16. Since power is being exchanged between the PV array and the SCESS, the power generated from the PV array, $P_{PV}$, is unaffected because of the fault at the grid side and is stored in the SCESS $P_{SC}$, as shown in FIG. 17. The oscillation of the grid power because of the fault is reduced for a system having a SCESS as compared to a system without energy storage, as shown in FIG. 18. FIG. 19 shows the power stored in the SCESS, which is generated by the PV array during the fault. The inverter and fault currents during the applied fault are shown in FIG. 20. The reactive power set point prior to the fault is zero, but during the fault, the SCESS participates in riding the fault by increasing the reactive power $Q_g$, as shown in FIG. 21. The DC link voltage is controlled by the buck-boost converter for the system having the SCESS, but the inverter controls this voltage if there is no energy storage. As can be seen from FIG. 22, the DC link voltage is kept constant to its reference value of 650 V for a system equipped with SCESS. The operation of the PV array is unaffected if the system has energy storage, as shown in FIGS. 23-24. The PV array MPPT tracks the maximum voltage in spite of the fault, as shown in FIG. 25. The actual and reference charging current 2600 of the SCESS is shown in FIG. 26.

It is to be understood that the present invention is not limited to the embodiments described above, but encompasses any and all embodiments within the scope of the following claims.

We claim:

1. A fault ride-through and power smoothing system, comprising:
   a photovoltaic (PV) array;
   a DC-DC buck converter in operable communication with the PV array, the DC-DC buck converter having an output and a duty cycle control input;
   an incremental conductance circuit for continuously adjusting the duty cycle of the DC-DC buck converter under varying irradiation and temperature for maximum power point tracking (MPPT) of the PV array to instantly locate maximum voltage or maximum current to obtain maximum power output from the PV array;

a DC-link capacitor connected to the buck converter output and supplying a constant DC voltage, $V_{DC}$;

a supercapacitor energy storage system (SCESS);

a buck-boost converter connected across the DC-link capacitor, the SCESS being connected to the buck-boost converter;

a buck-boost converter controller circuit connected to the buck-boost converter for controlling the buck-boost converter to charge the SCESS and to maintain the constant DC voltage, $V_{DC}$, across the DC-link capacitor during a fault; and a voltage source converter (VSC) having an input connected to the DC-link capacitor and having an output adapted for connection to an AC power grid or an AC load, the VSC including:
- a two-level, three-phase power inverter;
- an ABC to DQ converter connected to the power inverter; and
- a P-Q inverter controller circuit for controlling the power inverter, wherein, during the fault, power stored in the SCESS is made available to the DC-link capacitor and transferred to either an AC load or to the main grid to ride through the fault and smooth power of the system.

2. The fault ride-through and power smoothing system according to claim 1, wherein said buck-boost converter controller circuit comprises:

a first control loop having a summer, the summer having an input including a reference voltage input, $V_{DCref}$, and an inverting input including the constant DC voltage supplied by the DC-link capacitor, $V_{DC}$, the first control loop further having a first PI controller accepting the sum of $V_{DCref}$ and $-V_{DC}$ and providing a reference super capacitor current, $I_{SCref}$, at an output of the first PI controller;

a second control loop in cascade with the first control loop, the second control loop having a summer having an input including the reference super capacitor current, $I_{SCref}$, and having an inverting input receiving the actual inductor current of the buck-boost converter, $I_{SC}$, the second control loop having a second PI controller accepting the sum of $I_{SCref}$ and $-I_{SC}$ and having a control signal, $V_s$, at an output of the second PI controller; and means for comparing a triangular wave with the output control signal, $V_s$, to generate firing pulses to the buck-boost converter.

3. The fault ride-through and power smoothing system according to claim 2, wherein the reference supercapacitor current, $I_{SCref}$, is characterized in Laplace transform by the relation, $$I_{SCref} = (V_{DCref} - V_{DC}) * \left(k_{PO} + \frac{k_{IO}}{s}\right),$$

and the control signal, $V_s$, is characterized in Laplace transform by the relation, $$V_S = (I_{SCref} - I_{SC}) * \left(k_{PI} + \frac{k_{II}}{s}\right),$$

where $K_{PI}$ and $K_{PO}$ are the proportional constants for the buck boost converter, and $K_{II}$ and $K_{IO}$ are the integral constants for the buck boost converter.

* * * * *